DERBY, TRIPPEL & GAUSSOIN.
Refining Steel.
No. 50,804. Patented Nov. 7, 1865.
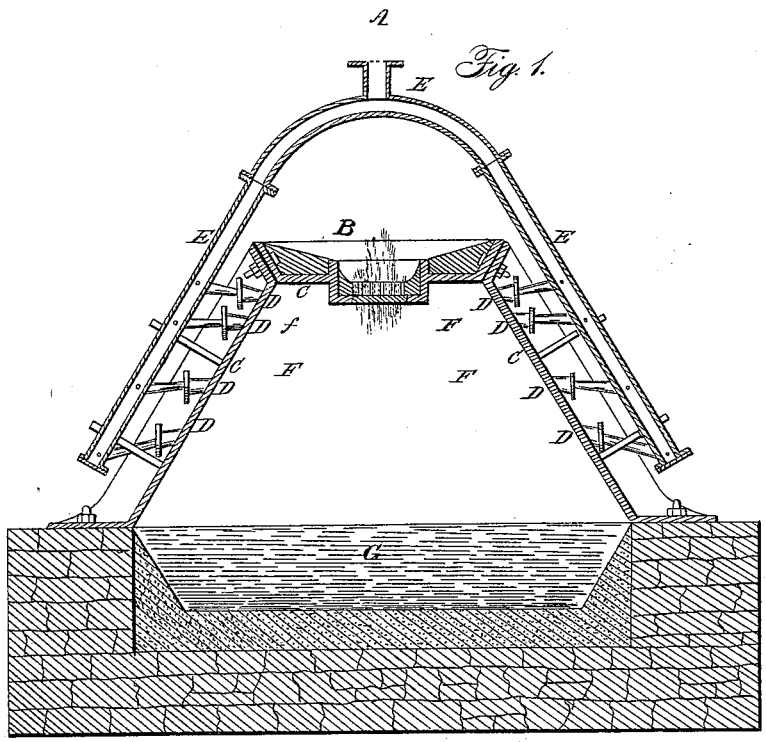
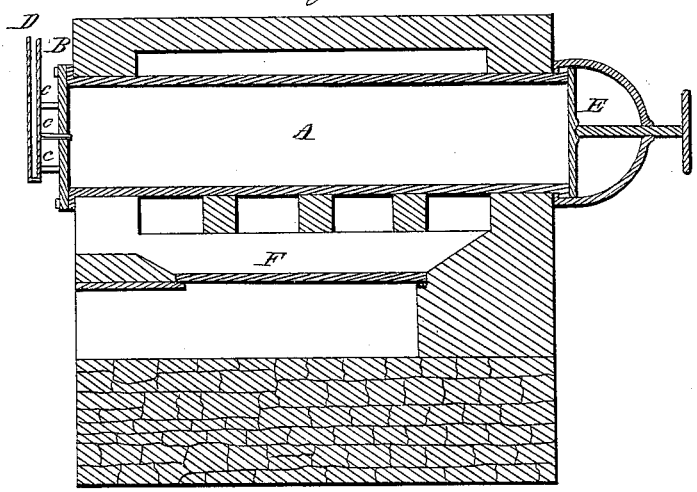
Witnesses:
Inventor:

UNITED STATES PATENT OFFICE.

JULIAN DEBY, OF NEW YORK, AND ALEXR. TRIPPEL, OF BROOKLYN, N. Y., AND EUGENE GAUSSOIN, OF BALTIMORE, MARYLAND.

IMPROVEMENT IN THE MANUFACTURE OF STEEL.

Specification forming part of Letters Patent No. 50,804, dated November 7, 1865.

*To all whom it may concern:*

Be it known that we, JULIAN DEBY, of New York city, in the State of New York, ALEXANDER TRIPPEL, of Brooklyn, in the State of New York, and EUGENE GAUSSOIN, of Baltimore, in the State of Maryland, have invented a new and Improved Mode of Manufacturing Steel from Ores of Iron; and we do hereby declare that the following is a full and exact description thereof, reference being had to the accompanying drawings, and to the letters of reference marked thereon.

The nature of our invention consists in a series of operations as herein set forth.

The molten iron running from a blast-furnace is taken through a conduit A into the orifice B, Figure 1, situated at the top of the arch C, which may be brick or iron. The sides of this arch are pierced so as to allow of the introduction of cast-iron tuyères D, which are inserted obliquely, with their orifices inclined slightly upward. These tuyeres are sixteen, more or less, in number, and are placed on two or more rows on each side, but so disposed that the jets of steam issuing from them form a complete net-work in the middle of the concavity of the arch. These tuyeres communicate with a small high-pressure boiler by means of the connecting-pipe E. Under the arch, and forming the ground-floor, is a tank or reservoir containing water, G. The liquid iron B, falling through the orifice C, meets the jets of steam F, which are either saturated or superheated steam, and which form, as it were, a sieve through which the metal has to pass before reaching the water tank or cistern G. The contact of the steam with the hot metal causes the instant decomposition of the steam into its constituent elements, with production of ozone. The oxygen combines in part with the metal, while the hydrogen, uniting with the carbon, burns and escapes without the production of any deleterious gases. The nascent hydrogen and oxygen also combine rapidly with various substances, which are commonly found in the crude metals, such as sulphur, phosphorus, and other bodies which are thus eliminated. The violent action of the steam on the flowing stream of molten iron has for effect the granulation of the whole mass of metal. The fall of the granulated iron into the water-tank G chills and hardens the small shot-like globules before they can agglutinate. The rapid cooling of the globules by the water causes their contraction, and by so doing separates mechanically the silica which formed the outer coating of the liquid globules.

The granulated iron, when taken out of the tank, is dried and passed over a fine sieve, which separates at once the metallic portion from the fine and light silicious particles.

Iron which has undergone the preceding operation being as crude as white crystallized pig, it becomes necessary to make it undergo a further treatment. This consists in covering each globule of the granulated iron with a coating of magnetic oxide of iron, which, as is well known, is the principle of the good quality of the Swedish iron from which is manufactured the best steel in the world. For this purpose we use a small brick furnace, Fig. 2. On the hearth rests an iron box, A, hermetically closed. The two ends of this box are even with the brick-work.

To the front end, B, we adapt five or more small tuyeres, C, corresponding with the steam-boiler, by means of the connecting-pipe D. The other end of the box has a movable cover, E, furnished with an orifice for the escape of the hydrogen produced by the decomposition of the steam during the production of the magnetic oxide. The granulated iron is placed into the box, the fire lighted under it on the grate F, and as soon as the whole mass has attained a dull red heat the steam is admitted. The iron is rapidly oxidized by this operation, which lasts from two to three hours, according to the quality of steel which it is wished to produce. Soft or hard steel can be made at will by our process.

As regards the subsequent treatment of the oxide for its transformation into merchantable steel, it is done by the ordinary well-known process, with certain practical precautions which it is useless here to enumerate, as we do not claim them in our present patent.

What we do claim as new in our process for the manufacture of steel from ores of iron is—

1. The tuyeres passing through the walls of an arch and carrying steam to the liquid pig after it has left the furnace so as to produce granulation.

2. The water tank or reservoir placed under said arch for the purpose of receiving and chilling the granulated pig.

3. The tuyeres adapted to the furnace, Fig. 2, for the purpose of carrying steam to the reheated granular pig with a view to transform it into magnetic oxide.

4. The general disposition of the appliances herein described and figured for the production of said granulated, chilled, and oxidized iron, as herein substantially set forth and specified.

JULIAN DEBY.
ALEX. TRIPPEL.
EUG. GAUSSOIN.

Witnesses:
   A. R. CULVER,
   F. B. RUNG,
   D. A. MORRIS.